United States Patent [19]

Maillot

[11] Patent Number: 5,553,897
[45] Date of Patent: Sep. 10, 1996

[54] FASTENING SYSTEM FOR FASTENING A THROUGH PIPE TO A HEARTH WALL, THE PIPE OPENING INTO A BOX

[75] Inventor: Frédéric Maillot, Clamart, France

[73] Assignee: GEC Alsthom Stein Industrie, Velizy-Villacoublay, France

[21] Appl. No.: 491,574

[22] Filed: Jun. 16, 1995

[30] Foreign Application Priority Data

Jun. 20, 1994 [FR] France .................................. 94 07524

[51] Int. Cl.⁶ ............................................. F16L 5/06
[52] U.S. Cl. ..................... 285/192; 285/206; 285/286; 285/340; 110/245; 122/4 D; 165/104.16; 432/58
[58] Field of Search ...................... 285/192, 206, 285/215, 340, 286; 110/245; 122/4 D; 165/104.16; 432/58

[56] References Cited

U.S. PATENT DOCUMENTS

| | | | |
|---|---|---|---|
| 899,313 | 9/1908 | Maurer | 285/206 X |
| 2,464,332 | 3/1949 | Maund et al. | 285/192 X |
| 2,711,841 | 6/1955 | Schaefer et al. | 285/192 X |
| 2,992,840 | 7/1961 | Reynolds et al. | 285/340 X |
| 3,058,762 | 10/1962 | Howe | 285/340 |
| 3,164,890 | 1/1965 | Schmohl | 285/340 X |
| 3,805,891 | 4/1974 | Reinhard et al. | |
| 4,418,650 | 12/1983 | Johnson et al. | |

FOREIGN PATENT DOCUMENTS

| | | | |
|---|---|---|---|
| 199104 | 8/1958 | Austria | 285/192 |
| 8511316 | 4/1988 | Germany. | |
| 1024645 | 6/1983 | U.S.S.R. | 285/192 |
| 339678 | 12/1930 | United Kingdom | 285/192 |

*Primary Examiner*—Dave W. Arola
*Attorney, Agent, or Firm*—Sughrue, Mion, Zinn, Macpeak & Seas

[57] ABSTRACT

The present invention relates to a fastening system for fastening a through pipe to a hearth wall, the pipe opening into a box. The fastening system comprises external pipe-securing means for securing the pipe to said screen, and an internal metal guide tube fitted over said pipe and having one of its ends interposed between said pipe and the orifice through which said pipe passes, its other end being externally threaded. The guide tube carries a rigid washer which is disposed so as to abut against the inside face of the inside layer, and against which a wall of the box is mounted, which wall is provided with an orifice that is larger than the cross-section of the guide tube, a sealing device being clamped against the wall of the box by a nut screwed onto the threaded end of the guide tube.

5 Claims, 1 Drawing Sheet

U.S. Patent Sep. 10, 1996 5,553,897
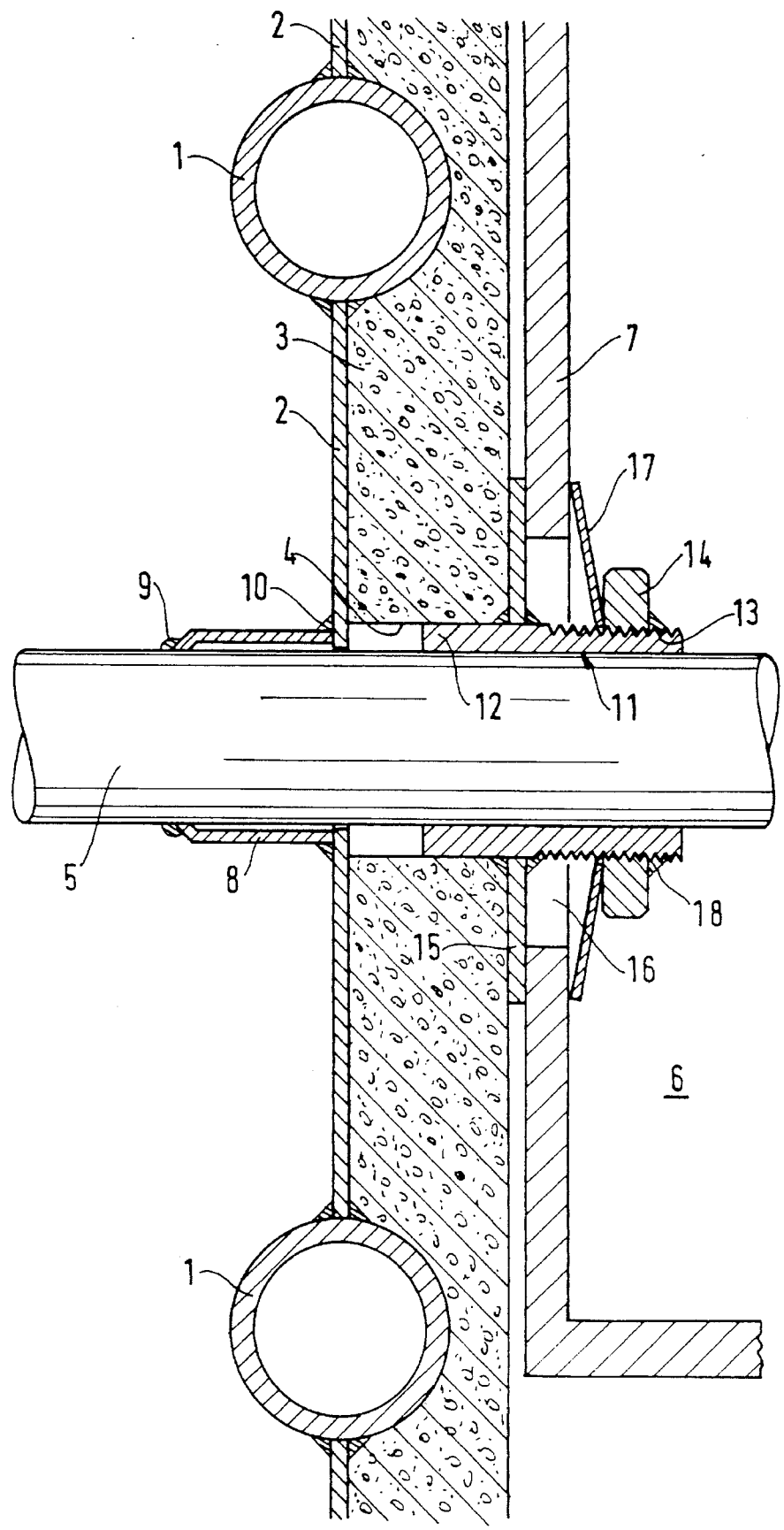

FASTENING SYSTEM FOR FASTENING A THROUGH PIPE TO A HEARTH WALL, THE PIPE OPENING INTO A BOX

FIELD OF THE INVENTION

The present invention relates to a fastening system for fastening a through pipe to a hearth wall, the pipe opening into a box.

More precisely, the present invention concerns a fastening system for fastening a through pipe to a hearth wall, the pipe passing through the wall via an orifice and opening into a box subjected to a pressure and to a temperature that are different from those of the hearth, said wall being provided both with an outside metal screen and an inside layer of refractory material.

BACKGROUND OF THE INVENTION

Such a system is, in particular, designed for fastening a fluidization box fed with air via a feed pipe passing through a wall of a hearth having a fluidized bed that is optionally a circulating fluidized bed. But such a system may also be used for fastening a flue for removing ash or soot at the output of a hearth or of heat exchangers. In a particular use, such a box may be the fluidization box of a fluidized bed inside the hearth.

A hearth wall is generally made up of an outside screen of heat exchange tubes connected to one another via welded plane fins, and of an inside layer of refractory material, in particular refractory concrete.

Such a fastening system must enable the pipe to pass through the wall, it must seal the hearth and the box relative to each other, and it must enable the hearth wall and the box wall to expand differentially once they are connected together since they are subjected to different pressures and temperatures. An object of the invention is to provide such a system that is reliable even though it is particularly simple.

OBJECTS AND SUMMARY OF THE INVENTION

To this end, the invention provides that the fastening system comprises:

external pipe-securing means for securing the pipe to the screen; and an internal metal guide tube fitted over said pipe and having one of its ends interposed between said orifice and said pipe, its other end being externally threaded;

the guide tube carrying a rigid washer which is secured thereto, which is disposed so as to abut against the inside face of the inside layer, and against which a wall of the box is mounted, which wall is provided with an orifice that is larger than the cross-section of the guide tube, a sealing device being clamped against the wall of the box by a nut screwed onto the threaded end of the guide tube.

In a preferred embodiment of the invention, the sealing device is a frustoconical resilient washer having its outside diameter greater than the largest dimension of the orifice in the wall of the box.

Advantageously, once it has been tightened, the nut is welded onto the guide tube.

Preferably, said pipe-securing means are constituted by an external metal sleeve welded to said screen, inside which sleeve said pipe is disposed and welded.

Said rigid washer may be welded to said guide tube.

BRIEF DESCRIPTION OF THE DRAWING

A preferred embodiment of the invention is described in more detail below with reference to the accompanying drawing, in which:

the sole FIGURE is a section view through a fastening system of the invention.

MORE DETAILED DESCRIPTION

A hearth wall includes an outside screen of heat exchange tubes 1 connected to one another via welded plane fins 2, and an inside layer 3 of refractory material, e.g. refractory concrete.

The hearth wall is provided with a through orifice 4 via which a pipe 5 can pass, the pipe opening into a box 6 subjected to a temperature and to a pressure that are different to those of the hearth.

The system of the invention is designed to fasten both said pipe 5 and a wall 7 of said box 6 to the wall of the hearth.

The system includes external pipe-securing means for securing the pipe 5 to said screen, which means are preferably constituted by an external metal sleeve 8 which is welded to a fin 2 of the screen by means of a weld fillet 10, and inside which the pipe 5 is disposed and welded to the sleeve 8 by means of a peripheral weld fillet 9. The sleeve 8 fastens the pipe 5 longitudinally.

The system also includes an internal metal guide tube 11 fitted over the pipe 5. One of its ends 12 is interposed between the orifice 4 and the pipe 5. The tube 11 fastens the pipe 5 transversely.

The other end 13 of the guide tube 11 is externally threaded and is capable of receiving a nut 14 as described below.

The guide tube 11 carries a washer 15, preferably welded on, which washer abuts against the inside face of the layer 3, and against which washer the wall 7 of the box 6 is mounted, which wall is provided with an orifice 16 that is larger than the cross-section of the guide tube 11 and smaller than that of the rigid washer 15.

A frustoconical resilient metal washer 17 of the nut-locking type is then fitted over the guide tube 11.

It is clamped against the wall 7 of the box 6 by the nut 14 screwed onto the threaded end 13 of the guide tube 11. Once it has been tightened, the nut 14 is welded to the guide tube 12 by means of a weld fillet 18.

The resilient washer 17 has an outside diameter that is greater than the largest dimension of the orifice 16 in the wall 7 of the box 6. This orifice 16 is preferably circular, and the outside diameter of the washer 17 is therefore greater than the diameter of said orifice.

The wall 7 of the box 6 is clamped between the rigid washer 15 and the resilient washer 17. In this way sealing is provided between the hearth and the box 6.

Also in this way, it is possible for the wall 7 of the box and the wall of the hearth to expand differentially.

I claim:

1. A fastening system for fastening a through pipe and a box to a hearth wall of a hearth, the hearth wall including an outside metal screen, an inside layer of refractory material which defines an inside face, an orifice, the box including a wall provided with a further orifice and being disposed proximate to the inside face, the through pipe passing through the hearth wall via the orifice and through the further orifice and opening into the box which is subjected to a pressure and to a temperature that are different from those of the hearth, said fastening system comprising:

- external pipe-securing means for securing the through pipe to the outside metal screen;
- an internal metal guide tube fitted over the through pipe and having one end interposed between the orifice and the through pipe, and another end being externally threaded;
- a rigid washer fixedly secured externally to said internal metal guide tube and disposed so as to abut against the inside face of the inside layer of refractory material, the wall of the box being mounted against said rigid washer, and the further orifice in the wall of the box being larger than a cross-section of said internal metal guide tube;
- a sealing device fitted over said internal metal guide tube and disposed against the wall of the box; and
- a threaded nut screwed onto the threaded end of said internal metal guide tube so as to clamp said sealing device against the wall of the box, thereby sandwiching the wall of the box between said rigid washer and said sealing device.

2. The system according to claim 1, wherein the sealing device is a frustoconical resilient washer having an outside diameter greater than the largest dimension of the further orifice in the wall of the box.

3. The system according to claim 1, wherein once said nut has been tightened, said nut is welded onto said internal metal guide tube.

4. The system according to claim 1, wherein said external pipe-securing means is constituted by an external metal sleeve welded to said outside metal screen, inside of which external metal sleeve said pipe is disposed and welded.

5. The system according to claim 1, wherein said rigid washer is welded to said internal metal guide tube.

* * * * *